(12) United States Patent
Reinsch

(10) Patent No.: US 6,428,090 B1
(45) Date of Patent: Aug. 6, 2002

(54) MOTOR VEHICLE ROOF GUIDE RAIL

(75) Inventor: Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/593,437

(22) Filed: Jun. 15, 2000

(30) Foreign Application Priority Data

Jun. 15, 1999 (DE) .......................................... 199 27 234

(51) Int. Cl.⁷ .................................................. B60J 7/06
(52) U.S. Cl. ................................. 296/216.08; 296/219
(58) Field of Search ............................... 296/219, 218, 296/223, 107.15, 107.16, 216.08

(56) References Cited

U.S. PATENT DOCUMENTS

| | | | | |
|---|---|---|---|---|
| 2,190,462 A | * | 2/1940 | Votypka | 296/223 X |
| 2,210,590 A | * | 8/1940 | Jobst | 296/219 |
| 5,558,388 A | | 9/1996 | Fürst et al. | 296/108 X |

FOREIGN PATENT DOCUMENTS

GB  339805  * 12/1930  ................. 296/219

* cited by examiner

*Primary Examiner*—Dennis H. Pedder
(74) *Attorney, Agent, or Firm*—Nixon Peabody LLP; David S. Safran

(57) ABSTRACT

The invention relates to a guide rail for movable accommodation of at least one openable roof part of a motor vehicle, the guide rail has at least a first and a second guide rail section (22; 26) which can be joined to one another via a joint (42), the first and the second guide rail section (22; 26) can be brought into alignment at the joint (42), and the openable roof part can be moved beyond the joint (42) without complex adjustment efforts and which still can be universally used is devised by the first guide rail section (22) having a centering element which interacts with a complementary opposite element on the second guide rail section (26), the first and/or the second guide rail section (22; 26) being flexibly supported at least in the area of the joint (42) on a roof part (12; 28) of the motor vehicle (10).

23 Claims, 10 Drawing Sheets

MOTOR VEHICLE ROOF GUIDE RAIL

BACKGROUND OF THE INVENTION

1. Field of the Invention

The invention relates to a guide rail for accommodating movement of at least one openable roof part of a motor vehicle, the guide rail having at least one first and one second guide rail section which can be joined to one another via a joint, the first and the second guide rail section being movable into alignment at the joint and the openable roof part can be movable beyond the joint.

2. Description of Related Art

German Patent Nos. DE 42 03 229 C2 and DE 43 26 291 C2 and their corresponding U.S. Pat. No. 5,558,388 disclose a guide rail in which first guide rail sections are located in the side members in which the openable roof part can be moved in the lengthwise direction of the motor vehicle into various open positions, and the side members are pivotally coupled to a rear roof part, detachably connected to a front cross beam which runs above the windshield, and after unlocking from the front cross beam they can be swung onto the rear roof part. In the rear roof part, there are two guide rail sections which support the openable roof part in the open position.

The entire motor vehicle roof including the rear window which is connected to the rear roof part can be lowered, to create a convertible-like roof opening, into a stowage space in the rear part of the motor vehicle by means of a mechanism which comprises several drives. In the front cross beam, there is an electric drive which effects unlocking of the side members from the cross beam, a second electric drive in the rear roof part undertakes displacement of the openable roof part and another electric drive which is likewise attached in the area of the rear roof part is used to swivel the side members. Furthermore, there is a hydraulic cylinder in the area of the rear motor vehicle side walls which provides for pivoting of the rear roof part together with the openable roof part which is held by the rear roof part, the side members which are pivoted onto the rear roof part, and rear columns (C-columns) on which the rear roof part rests on both sides.

One fundamental problem in divided guide rails lies in the moving of two or more guide rail sections into alignment at the joints, and in doing so, achieving serviceable tolerances.

Conventionally, this is done by the guide rail sections being attached via detachable mechanical connecting elements, for example, by means of screws, to the roof parts which support or accommodate them, for which time-consuming, and thus expensive, adjustment efforts become necessary. In doing so, the accessibility of the screw sites must be ensured; this generally necessitates additional cover parts, by which not only limitations in the optical appearance, but also other costs for parts and installation arise.

SUMMARY OF THE INVENTION

The primary object of the present invention is to devise a guide rail of the initially mentioned type in which the guide rail sections can be brought into alignment without complex adjustment efforts, and the guide rails can be universally used.

This object is achieved via a guide rail with at least one first and one second guide rail section which can be joined to one another via a joint and which can be moved into alignment with one another at the joint, the openable roof part being movable beyond the joint, by the first guide rail section comprising a centering element or one being fixed on it, which interacts with a complementary opposite element on the second guide rail section or is fixed on it, the first and/or the second guide rail section being flexibly supported at least in the area of the joint on a roof part of the motor vehicle.

By the centering element interacting with the opposite element when the guide rail sections are brought together, via the support of the first and/or second guide rail section on the roof part, the support being made flexible at least in the area of the joint, the guide rail sections are brought into alignment, and parts tolerances, especially tolerances of the roof part which support the guide rail section, are equalized. When the guide rail sections are brought together, the tolerances at the joint are determined essentially only by the centering element and the opposite element, eliminating the need for complex adjustment efforts.

Preferably, the centering element and the opposite element are made such that, when the first and the second guide rail section are joined or brought together, alignment errors between the guide rail sections can be equalized by linear elastic displacement of the end of the first and/or the second guide rail section facing the joint in the directions perpendicular to the displacement direction of the openable roof part.

The centering element and the opposite element are furthermore made such that, when the first and the second guide rail section are brought together or connected, alignment errors between the guide rail sections can be equalized by elastic tilting of the end of the first and/or the second guide rail section facing the joint around an axis which runs essentially in the displacement direction of the openable roof part.

The flexible support can be made such that the flexibility is greatest in the area of the joint and decreases with increasing distance from the joint, and the first and/or the second guide rail section can be rigidly connected to the roof part in the area of its end facing away from the joint. In particular, the first and/or the second guide rail section over roughly 20 to 40% of its total length, proceeding from its end facing away from the joint, is rigidly connected to the roof part, for example, via mechanical connecting elements, such as rivets or screws. Preferably, roughly one third of the guide rail section is rigidly connected to the roof part.

In another embodiment of the intention, the area of the first and/or the second guide rail section which extends between the joint and the area of the guide rail section which is rigidly connected to the roof part is guided freely in or on the roof part. In this way, the bending elasticity of the guide rail section itself can be used to achieve flexibility of the two guide rail sections with reference to one another in the area of the joint.

If the first and/or the second guide rail section are supported in the area of the joint via a rubber-elastic intermediate element on the roof part, rattling noise can be avoided and effective vibration damping can be achieved. Furthermore, it is possible to also support the entire guide rail section flexibly or floating, for example, by its being connected to the roof part solely via the rubber elastic intermediate elements and a rigid connection of its end facing away from the joint to the roof part being eliminated.

The centering element can comprise a centering journal and the opposing element can comprise a centering bearing, and the centering journal can be inserted into the centering bearing, preferably, essentially perpendicularly with respect to the plane which comprises the joint.

The centering bearing can be made such that it comprises an insertion section which advantageously faces the joint and a centering section, the insertion section tapering towards the centering section and the centering journal being accommodated free from play in the centering section.

The alignment tolerances with the guide rail sections brought together can be reduced if the centering journal can be brought into linear contact with the centering section of the centering bearing.

If the centering journal has a non-round cross section at least in the area of its play-free accommodation in the centering section, the centering journal is prevented from being able to turn in the centering bearing. This ensures not only centering or alignment of the two guide rail sections in directions essentially perpendicular to the direction of insertion of the centering journal into the centering bearing, but also prevents pivoting of the two sections around an axis which runs in the insertion direction. Here, the centering journal in the area of its play-free accommodation in the centering section, preferably, has a cross section which is essentially rectangular.

The insertion of the centering journal into the centering bearing and its defined contact in the centering section can be improved by the centering journal being elongated proceeding from its area of play-free accommodation in the centering section essentially in and against its insertion direction into the centering bearing and by its tapering in the two directions.

The centering bearing can be easily and economically produced even with a complex geometry if it is made as a plastic part and is injected onto the second guide rail section in the area of the joint.

In another embodiment of the invention, the centering element can comprise at least one second centering journal and the opposite element can comprise at least one second centering bearing, and the second centering journal can be inserted into the second centering bearing. By providing two centering journals and centering bearings which can be made fundamentally the same, especially alignment errors as a result of tilting or twisting of the guide rail sections around an axis placed in the displacement direction of the openable roof part are reduced.

It is possible for the second centering journal and the second centering bearing to be made less complex than the first centering journal and the first centering bearing. In particular, the second centering journal can be made as a centering strip which is fixed in the first guide rail section and projects above the joint, and it can be inserted into the second centering bearing which is molded onto the second guide rail section, preferably in one piece. Here, the first and/or the second guide rail section is preferably made as a metallic extrusion.

The first and the second guide rail section can fundamentally be completely separable from one another. Alternatively or in combination therewith the guide rail sections can be pivoted at the joint with reference to one another, for example, similarly to the type known from DE 42 03 229 A1 and corresponding U.S. Pat. No. 5,558,388.

The first or second guide rail section can be located especially on a roof part which is connected detachably to the motor vehicle and which supports the openable roof part in its open position.

Furthermore, the first or second guide rail section can be located on the side members which extend in the displacement direction of the openable roof part, and the side members can also be detachably connected to the motor vehicle.

In the following, advantageous embodiments of the subject matter of the invention are explained using the drawings:

DETAILED DESCRIPTION OF THE INVENTION

Figure 1:
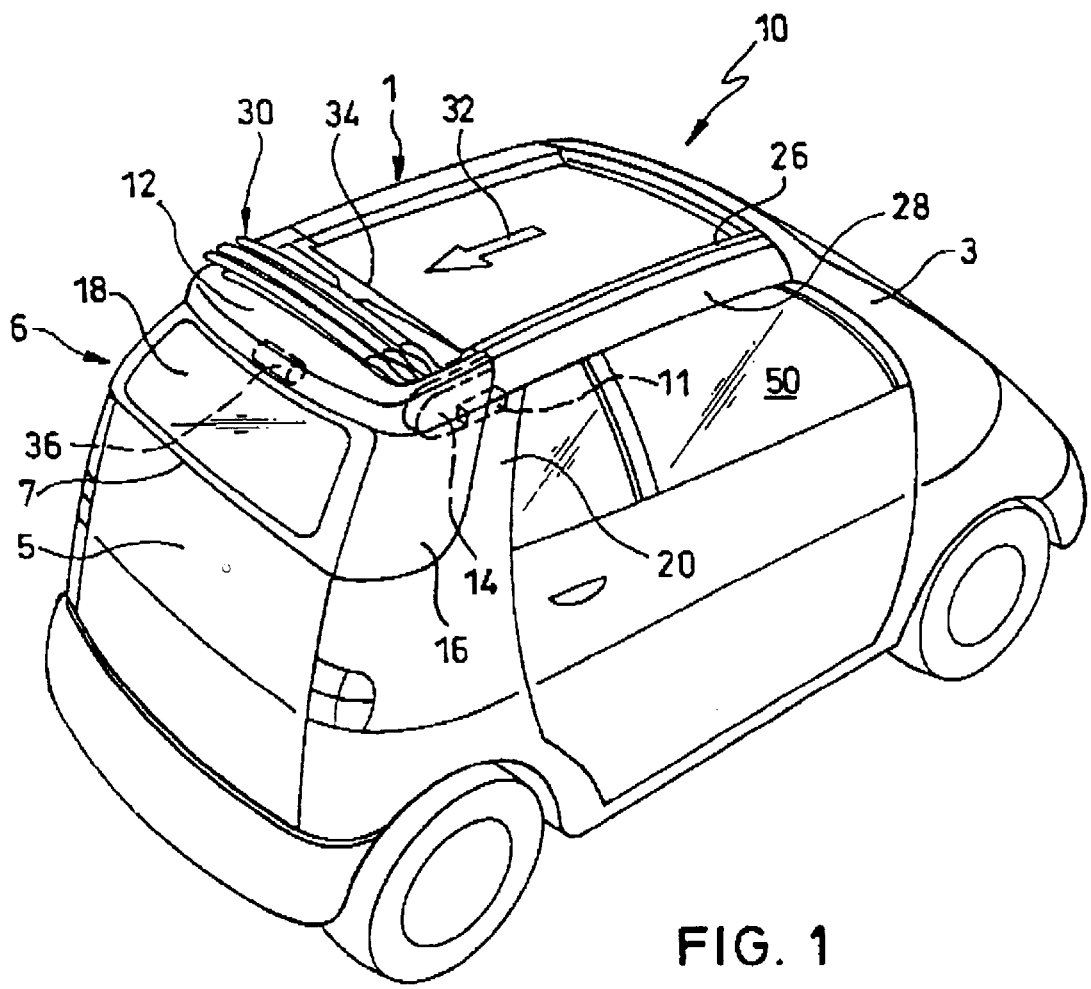
FIG. 1 is a perspective view of a motor vehicle with a rear roof part which is made as a roof cassette and has a folding roof as the openable roof part, the folding roof on the side which is both left and right in the direction of travel being movably supported in two guide rail sections, of which the first, rear guide rail section is located in the roof cassette and the second, front guide rail section is located in a side member which extends between the B column and a front cross beam which runs above the windshield.
Figure 2:
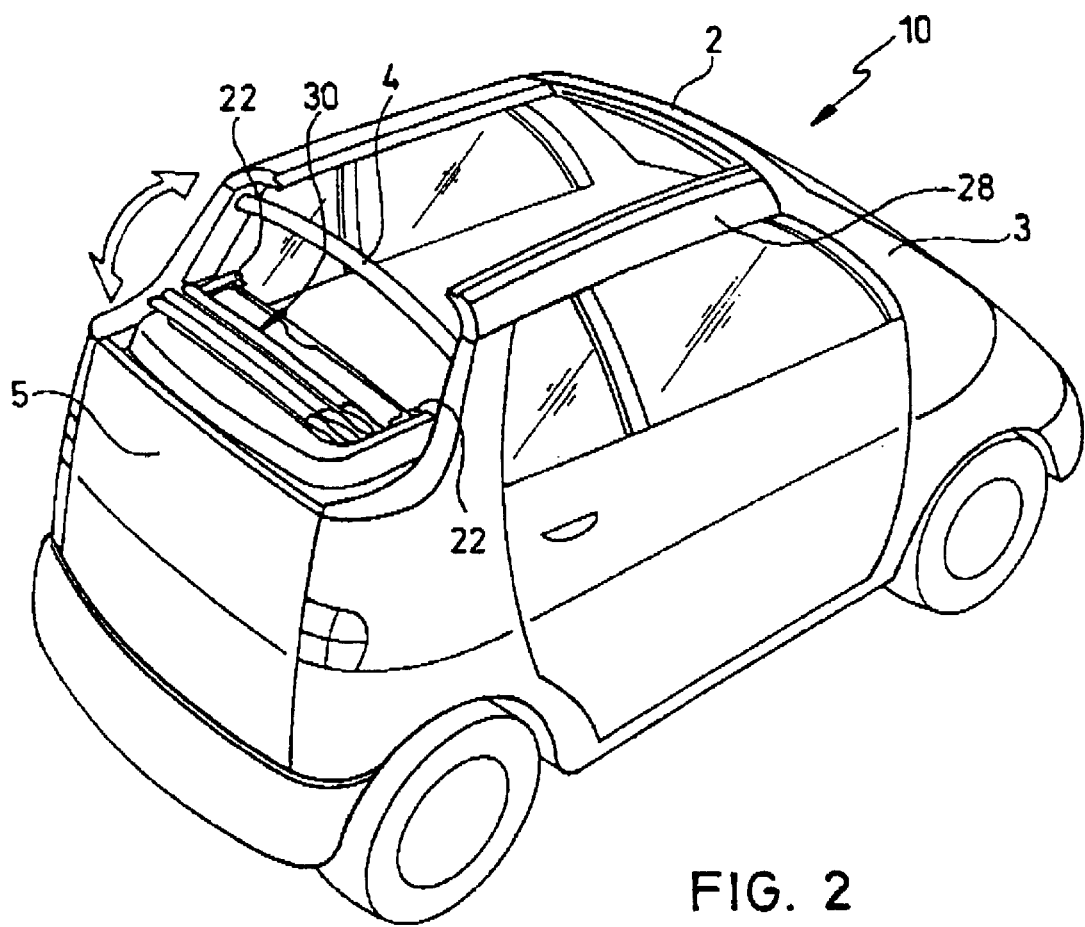
FIG. 2 is a perspective view of the motor vehicle from FIG. 1, the roof cassette together with folding roof which is in the open position being lowered into a rest position.
Figure 3:
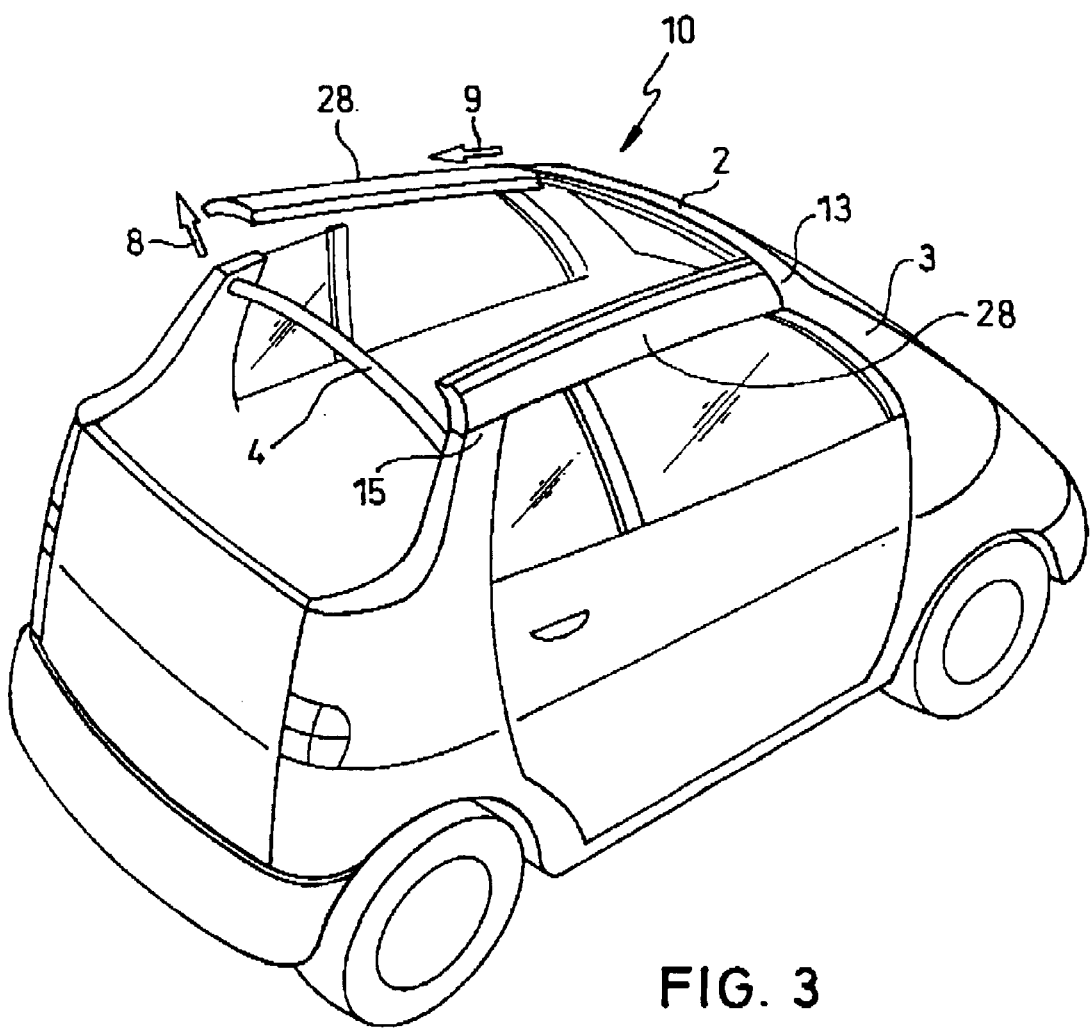
FIG. 3 is a perspective view of the motor vehicle from FIG. 1, in which for reasons of clarity the roof cassette together with the folding roof is not shown, dismounting of side members being illustrated.

FIGS. 1 to 3 show a motor vehicle 10 with a vehicle roof 1 which comprises a folding roof 30 as an openable roof part which can be actuated by a drive motor 36, a rear roof part which is made as a roof cassette 12, a rear part 6, and side members 28 which extend between the rear side columns (B columns 20) of the motor vehicle 10 and a front cross beam 2 which runs above the windshield. The folding roof 30 is movably supported in each of two guide rail sections on both the left and right sides in the direction of travel, of which the first, rear guide rail section 22 is located in the roof cassette 12 and the second, front guide rail section 26 is located in the side member 28. By means of the drive motor 36, the folding roof 30 can be moved in or opposite its opening direction 32 via compressively stiff cables (not shown) and can be moved between its open position (FIGS. 1 and 2) and its closed position into any intermediate positions. In the open position, the folding roof 30 is supported in the roof cassette 12, and all parts of the folding roof 30 which can be moved in the guide rail sections 22 and 26 are accommodated in the rear guide rail section 22 in the roof cassette 12, and can be locked with reference to the roof cassette 12. In doing so, the folding roof 30 is pushed so far to the rear in the opening direction 32 into the open position that its front edge 34 lies essentially flush with the front edge of the roof cassette 12.

Figure 9:
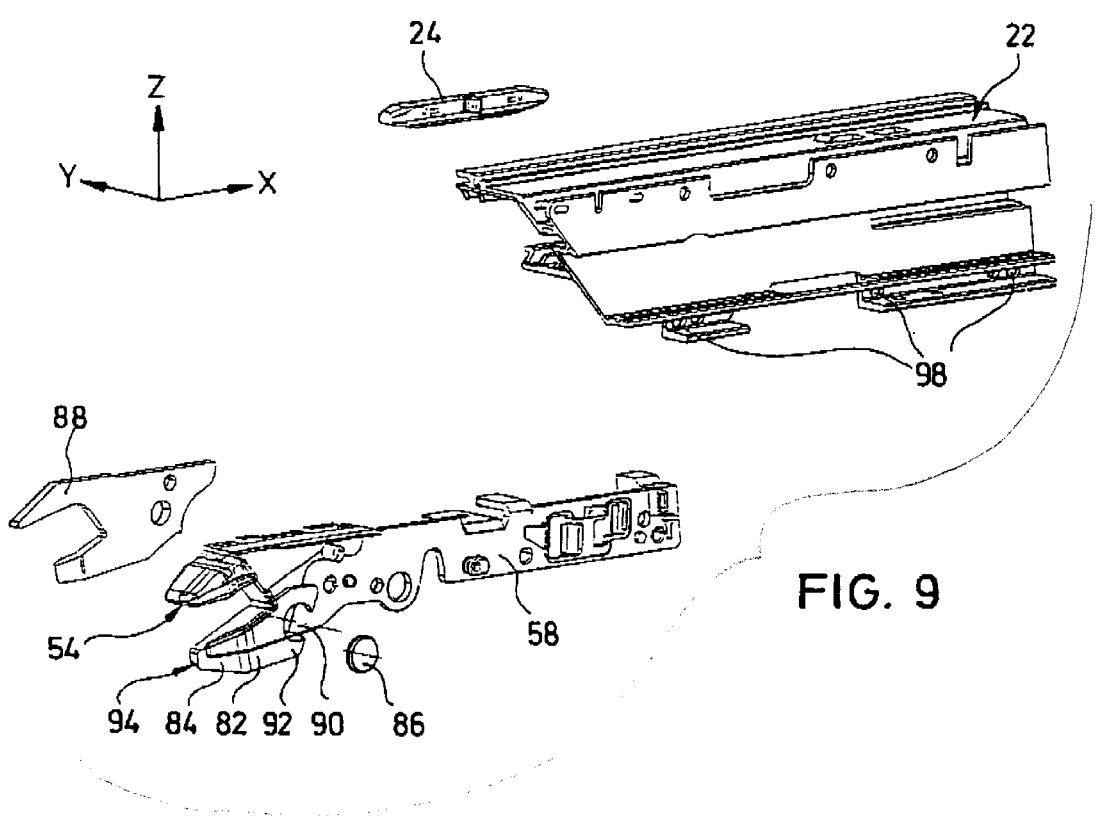
FIG. 9 shows an exploded view of the rear guide rail section which is accommodated in the roof cassette and of a centering element which is located on it.
Figure 10:
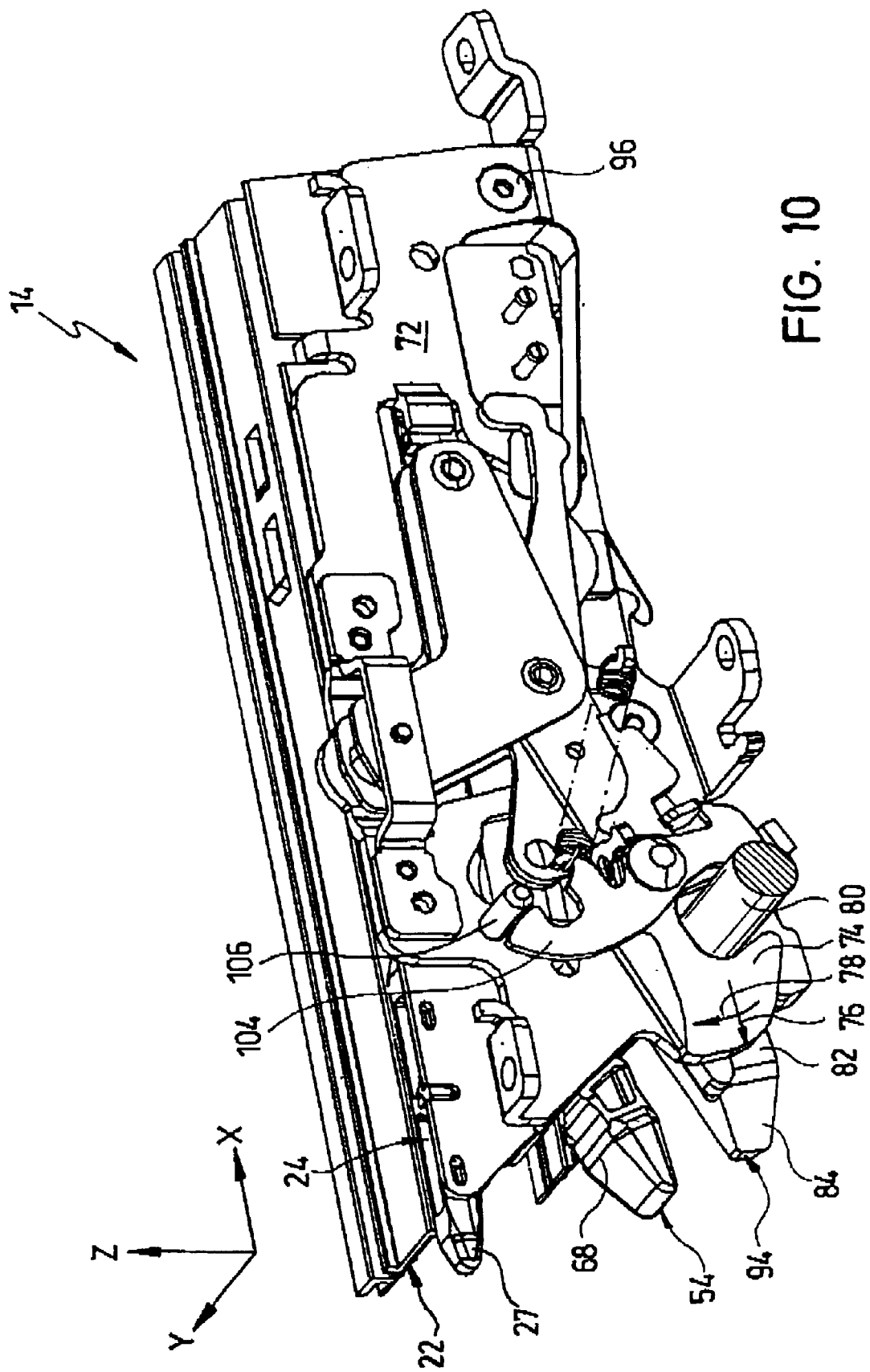
FIG. 10 is a perspective view of a closing device by which the roof cassette can be fixed on a thrust bearing which is attached to the B column of the motor vehicle, the rear guide rail section being fixed on the closing device.

The rear guide rail sections 22 which are located in the roof cassette 12 are attached to closing devices which, for their part, are fixed on the roof cassette 12 and which are labeled 14 as a whole (see FIG. 10). Each closing device 14 is attached symmetrically to an axis of symmetry which runs in the lengthwise direction of the motor vehicle within the roof cassette 12 on the either the left or right side of the roof cassette 12 relative to the direction of travel, and interacts with a thrust bearing 11 which is fixed near the top end of each of the B columns 20 in order to effect the locking and unlocking of the roof cassette 12 with reference to the B columns 20. Here, FIGS. 5 to 10 show in detail only the closing device and the guide rail sections which are on the left viewed in the direction of travel, the corresponding right-hand components or assemblies being made in mirror image. Furthermore, it is noted that the axis labeled X in FIGS. 4 to 10 points in the opening direction of the folding roof 30, i.e., in the same direction as the arrow 32 in FIG. 1 pointed towards the vehicle rear.

Figure 4:
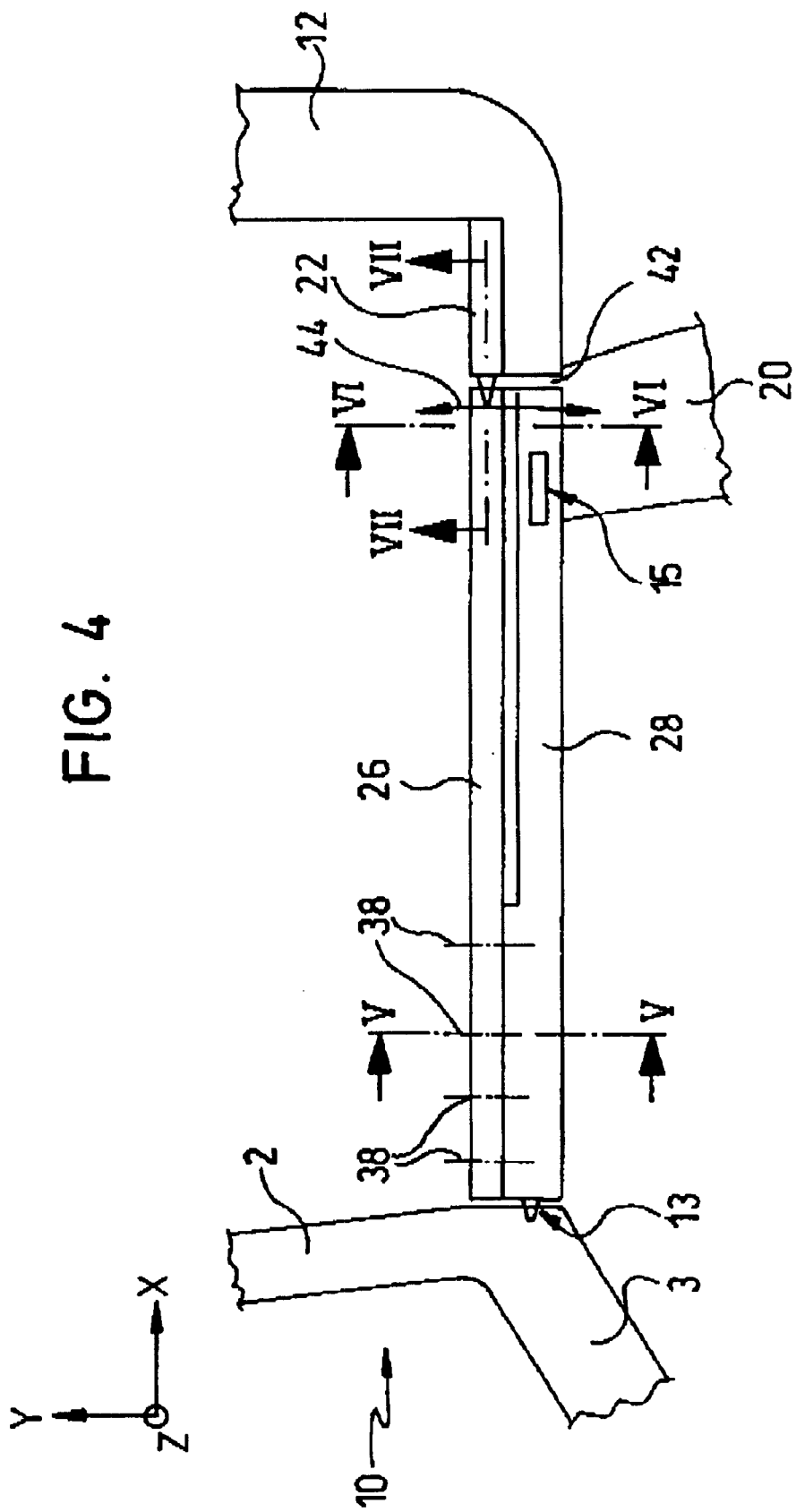
FIG. 4 is a schematic plan view of part of the half of the vehicle from FIG. 1 which is the left half viewed in the direction of travel, the folding roof not being shown.

The side members 28 are detachably joined to the motor vehicle 10 in the area of the joint between the front cross beam 2 which runs above the windshield and the front side columns (A columns 3), at which there are front side member bearings 13 and in the area of the top end of the rear columns (B columns 20). Additionally, there are rear side member bearings 15, as is shown in FIGS. 3 and 4. To dismount the side members 28, as shown in FIG. 3, first the rear side member bearings 15 are unlocked, the side members 28 are raised in the direction of the arrow 8 at their back end, and then, the side members 28 are pulled in the direction of the arrow 9 to the rear out of the front side member bearings 13. The dismounted side members 28 can be placed in the motor vehicle 10 in corresponding accommodation devices, for example, in a rear door 5. A rear cross beam 4 can extend in the manner of a roll bar between the B columns 20 which are rigidly connected to the vehicle body.

The rear part 6 of the motor vehicle roof 1 is fixed on the roof cassette 12 and comprises a rear window 18 of foldable plastic and likewise foldable side parts 16. The roof cassette 12 is connected to the vehicle body via a four-bar arrangement which is not shown, but is fully described in a commonly assigned U.S. Pat. No. 6,267,433, which is hereby incorporated by reference. After unlocking from the thrust bearing 11 of the B columns 20, the roof cassette 12 can be lowered to such an extent that the top of the roof cassette 12 comes to rest essentially at the height of the equator of the motor vehicle. To lock the roof cassette 12 in the lowered position, on the four-bar arrangement itself, there is likewise a thrust bearing with which the closing device 14 interacts in a similar manner as with the thrust bearing 11. The bottom 7 of the rear part 6 can be placed against the rear door 5 and can be folded up in order to improve access to the stowage space placed in the rear of the vehicle. The rear door 5, for its part, is pivotally connected at its bottom to the motor vehicle body and can be swung down independently of the position which the bottom 7 of the rear part 6 assumes and also with the roof cassette 12 lowered. To increase the stability of the rear part and to attach a lock latch for the rear door 5, there can be a cross beam on the bottom 7 of the rear part 6. Furthermore, as noted in the above-incorporated application, all movable parts of the folding roof 30 are held in the guide rail section 22 and can be decoupled together with the roof cassette 12 from the thrust bearing 11 mounted on the body.

The closing device 14, as follows from FIGS. 9 and 10, comprises a bearing plate 72, a locking hook 74 which can be pivoted in and opposite the direction of the arrow 78, which can be moved relative to the bearing plate 72 in and opposite the direction of the arrow 76, and which is moved preferably by means of motorized actuation by the drive motor 36. The locking hook 74 interacts with a pin 80 which is part of the thrust bearing 11 and can be moved from the rear catch position which is shown in FIG. 10 in the direction of the arrow 76 forward into a front catch position, the pin 80 being locked by the locking hook 74 in two positions in a U-shaped receiving groove which is made in the bearing plate 72 and which is open in the X axis direction. Proceeding from the front catch position of the locking hook 74, it can be raised in the direction of the arrow 78 from its lowered locking position (shown in FIG. 10) into a release position in order to release the pin 80 so that it can slide forwardly out of the receiving groove in the X axis direction. Thus, the roof cassette 12 is unlocked from the thrust bearings 11 of the B columns 20 and can be lowered. In the released position, the locking hook 74 is held via a retaining lever 104 which interacts with a holding pin 106.

Coupling of the roof cassette 12 to the thrust bearings 11 of the B columns 20, analogously, runs in the reverse sequence, the pin 80 being inserted into the receiving groove in the bearing plate 72 and actuating the retaining lever 104, so that the lever 104 disengages from the holding pin 106 and the locking hook 74 returns via spring pre-tensioning opposite the direction of the arrow 78, downward into its locking position. When the locking hook 74 is moved from its front position into its rear catch position, the roof cassette 12 is drawn to the thrust bearings 11 and the front and rear guide rail sections 22 and 26 push against one another on their facing ends in the area of their joint 42, or they assume a defined short distance relative to one another.

Figure 7:
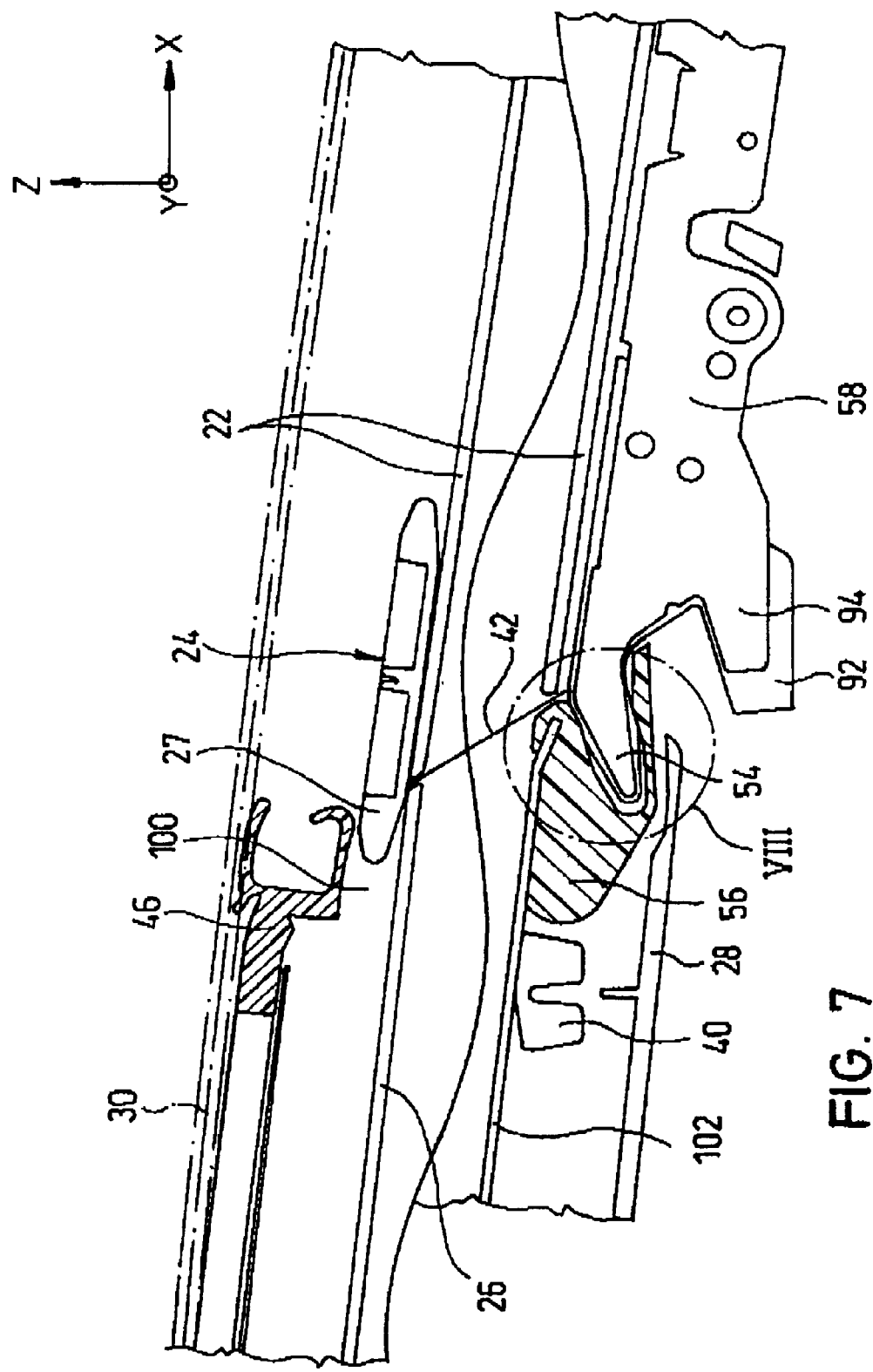
FIG. 7 is a partial section through the joint between the two guide rail sections taken along line VII—VII in FIG. 4.
Figure 8:
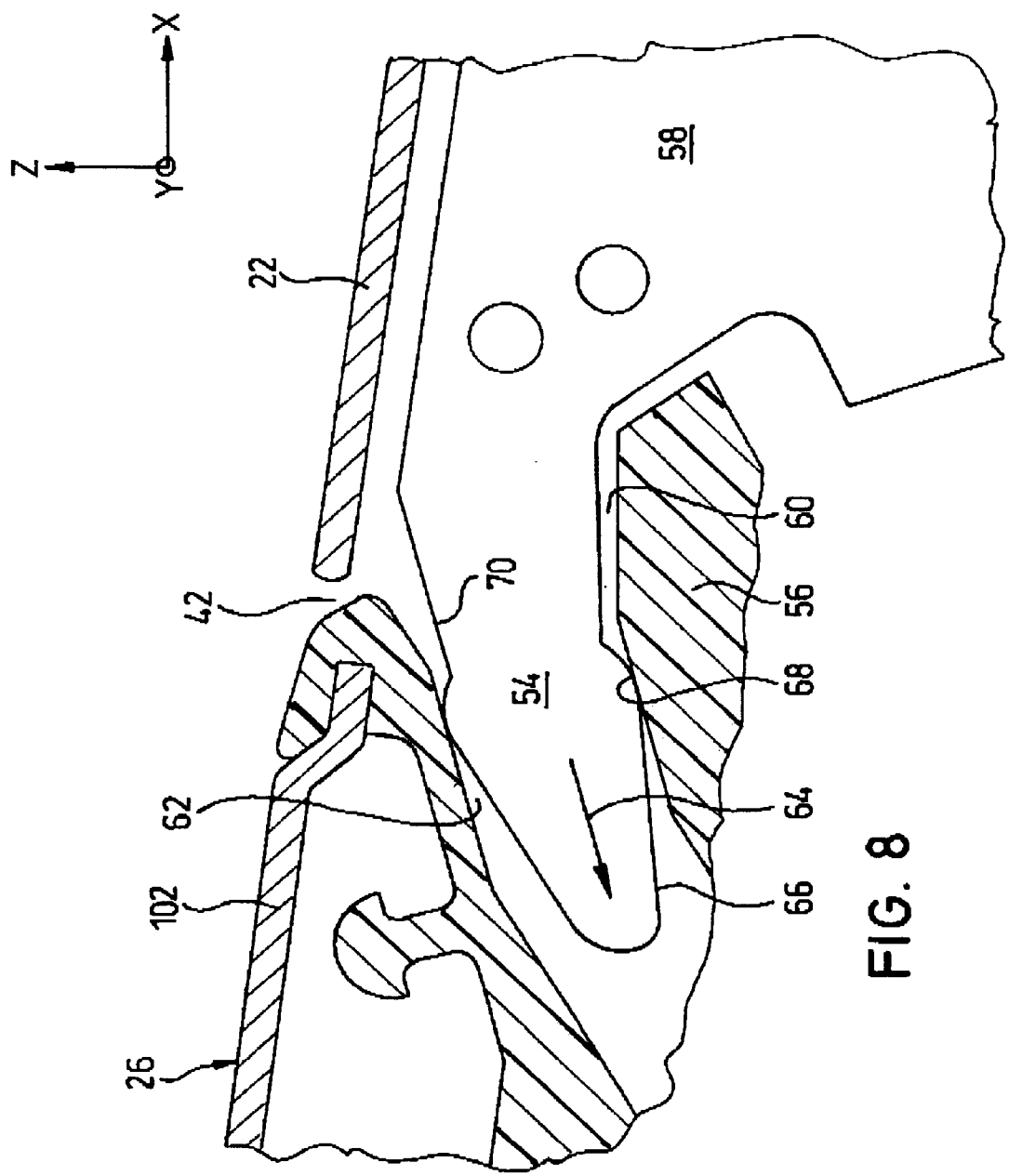
FIG. 8 is an enlarged detailed view of the area within circle VIII in FIG. 7.

To center or align the rear and the front guide rail section 22 and 26 in the joined state, as shown in FIG. 7, there is a centering element on the rear guide rail section 22 which comprises a centering strip 24 and a centering journal 54. This centering element interacts with a complementary opposite element on the front guide rail section 26. In doing so, the tip 27 of the centering strip 24 projects across the joint 42 between the two guide rail sections 22 and 26 and fits into a complementarily shaped receiver 100 which is molded in one piece to the front guide rail section 26 which is preferably made as a extrusion.

The centering strip 24, which is made as a molded plastic part is inserted into a groove in the upper section of the rear guide rail section 22 and is joined preferably by form-fit to the rear guide rail section 22. The centering journal 54, likewise, projects across the joint 42 and fits into a centering bearing 56 which is formed in the lower wall 102 of the front guide rail section 26 (see FIGS. 7 and 8). The centering bearing 56 can be easily and economically produced, even with a complex geometry, if it is made as a plastic part and is inserted onto the front guide rail section 26 in the area of the joint 42.

The centering journal 54 is located on a base plate 58 which is reinforced by means of a reinforcing sheet 88 (FIG. 9) and which is fixed on the rear guide rail section 22 by several screws 96 (only one of which is shown in FIG. 10) penetrating the bearing plate 72, openings 98 which are provided in the lower area on the rear guide rail section 22, and the base plate 58, and which join these components to one another and to other connecting elements, and if necessary, also alignment elements can be provided in order to ensure a defined position of the components with reference to one another.

The base plate 58 and the reinforcing plate 88 are made of metal, and on their end which projects across the joint 42, are made in the form of a U which is open in the X direction, and from which a top and a bottom leg form a metallic core for the centering journal 54 or for the centering plate 94. The outside contour of the centering journal 54 and the centering plate 94 are formed by a plastic extrusion coating 92. The centering plate 94 interacts with the end face of the pin 80 facing it and is used jointly with the right, mirror-image centering plate which is present on the side of the roof cassette 12 which is on the right in the direction of travel and the mirror-image pin of the right thrust bearing to center the roof cassette 12 in the +/−Y direction, for which purpose, the centering plate 94 has a centering surface 82 which is located in the X-Z plane.

In the area of the centering surface 82, in the extrusion coating 92, there is a round recess 90 into which a rubber element 86 is inserted and adhesively joined. The rubber element 86 is used to reduce noise and is placed in the centering surface 82 such that the end face of the pin 80 facing the centering surface 82 comes to rest over the rubber element 86 to the extent the locking hook 74 assumes its rear catch position with the pin 80 inserted into the receiving groove of the bearing plate 72. To better guide the pin 80 in the Y direction when it is inserted into the receiving groove, on the front end of the centering plate 94, there is a feed bevel 84 which ends in the centering surface 82.

As is apparent from FIGS. 4 to 7, the front guide rail section 26 is fixed on its front third via several blind rivets 38 essentially rigidly to the side member 28. Conversely, in the area of the front guide rail section 26, facing the joint 42 between the front guide rail section 26 and the side member 28, an elastically flexible intermediate element, such as a rubber buffer 40, is interposed between the guide rail section 26 and the side member 28 for noise and vibration damping.

Depending on the geometry and mechanical properties of the rubber buffer 40, the flexibility of the end of the front guide rail section 26 facing the joint 42 can be influenced so that, for example, the flexibility in the +/−Y direction, i.e., essentially in the direction of the double arrow 44, can differ from that in the +/−Z direction. Preferably, the flexibility of the end of the front guide rail section 26 facing the joint is greater in the direction of the double arrow 44 than the flexibility in the +/−Z direction. Conversely, the rear guide rail section 22 is joined essentially rigidly to the roof cassette 12 so that, for example, the distance assumed by the rear guide rail section 22 which is on the left in the direction of travel with respect to the right rear guide rail section in the Y direction depends essentially on the component tolerance of the roof cassette 12.

When the front and rear guide rail sections 26, 22 are brought together, as already mentioned, the centering element present on the rear guide rail section 22 interacts with the opposite element which is provided on the front guide rail section 26, the flexibility of the front guide rail section 26 being used to center or align the front guide rail section 26 in the area of the joint 42 with reference to the rear guide rail section 22 and to bring the two guide rail sections into alignment so that the sliders of the folding roof 30 which are movably accommodated in the guide rail sections 22 and 26 can be easily moved beyond the joint 42. In doing so, the center pin 54 and the centering bearing 56, first of all, assume the task of aligning the two guide rail sections 22 and 26 in the Y and Z direction with reference to one another and compensating for alignment errors in these directions, i.e., essentially in the directions perpendicular to the displacement direction of the folding roof 30.

For this purpose, the centering bearing 56 comprises an insertion section 60 and a centering section 62, the insertion section 60, proceeding from its open end facing the joint 42, tapering towards the centering section 62. The centering journal 54 with the guide rail sections 22 and 26 brought together is held essentially without play in the centering section 62 of the centering bearing 56 by a centering section 68 of the centering journal 54 being essentially in linear contact with the centering section 62 of the centering bearing 56.

The centering journal 54 which can be inserted in the insertion direction 64 (see FIG. 8) into the centering bearing 56 in the planes perpendicular to the insertion direction 64 has a roughly rectangular cross section, the longer side of the rectangle extending essentially in the +/−Y direction and the shorter side extending essentially in the +/−Z direction. The insertion direction 64 of the centering journal 54 can run in the direction of the X-axis, and thus, in the displacement direction of the folding roof 30 or, as in the embodiment shown, can assume a predetermined angle to the X-axis.

The centering section 68, viewed in the insertion direction 64, represents the area of the largest thickness of the centering journal 54 and is adjoined by an insertion section 66 which tapers towards the tip of the centering journal at its forward side in the insertion direction 64, and adjoins a release area 70 on the side opposite the insertion direction 64. The release area 70 with the guide rail sections 22 and 26 combined comes to rest in the area of the insertion section 60 of the centering bearing 56.

Because the centering journal 54 has a roughly rectangular cross section which is held without play in the centering section 62 of the centering bearing 56, the centering journal 54 and the centering bearing 56 also contribute to the two guide rail sections 22 and 26 being aligned with reference to an axis of rotation which runs essentially in the +/−X direction without the possibility of twisting or tilting, and possible alignment errors as a result of tilting around this axis are balanced.

In doing so, the flexible bearing of the front guide rail section 26 in the area of the joint 42 is used to turn the latter, depending on the angle, around the X-axis and to align it with reference to the rear guide rail section 22. The balancing of alignment errors between the front and the rear guide rail section 26 and 22, as a result of inclination, is significantly improved by using a second centering journal in the form of a centering strip 24 and a second centering bearing in the form of a receiver 100, the two centering journals or centering bearings preferably being spaced as far as possible, measured in the Y-Z plane, in order to ensure favorable lever ratios for the balancing of inclination angle relative to the X axis and a large tolerance certainty.

Figure 5:
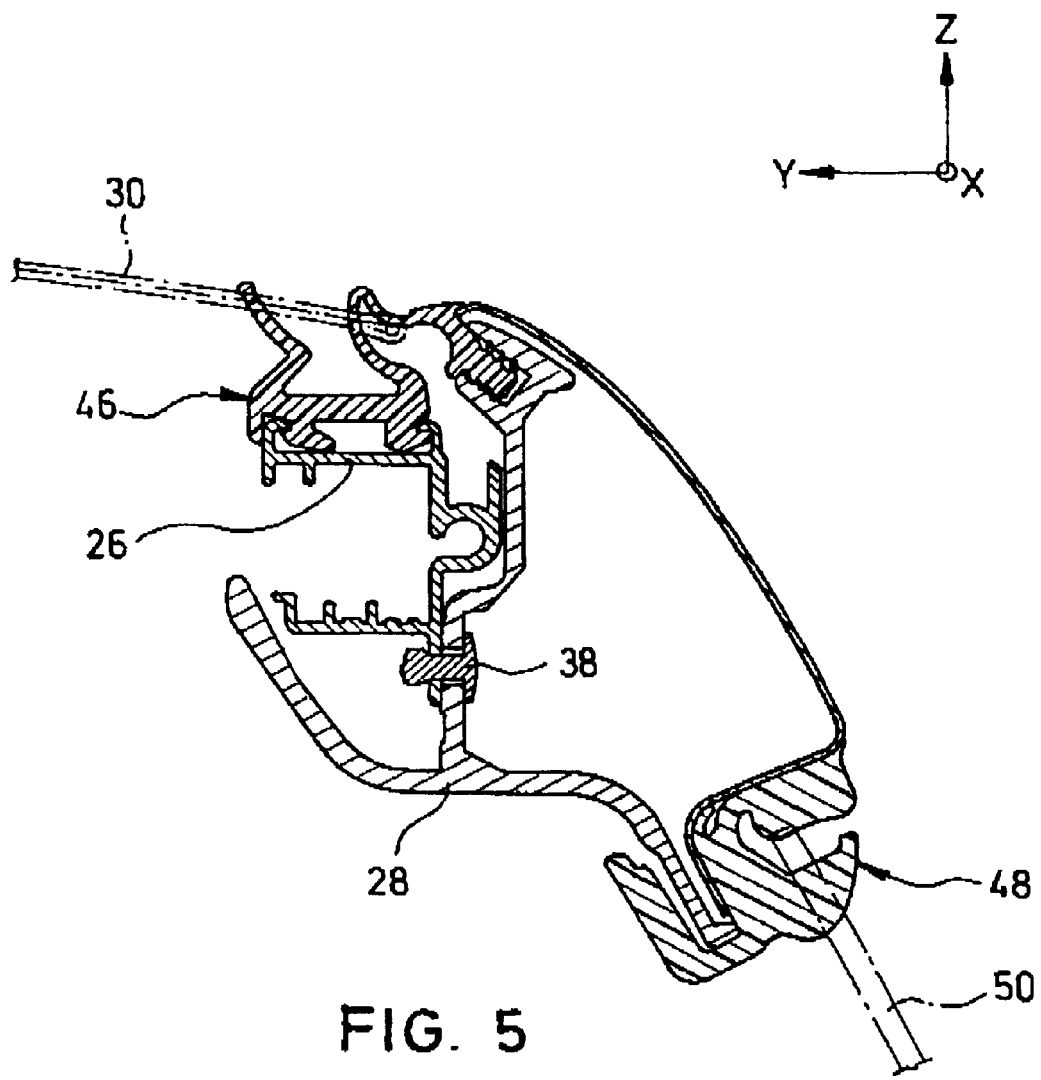
FIG. 5 is a partial section through the front area of the side member taken along line V—V of FIG. 4.
Figure 6:
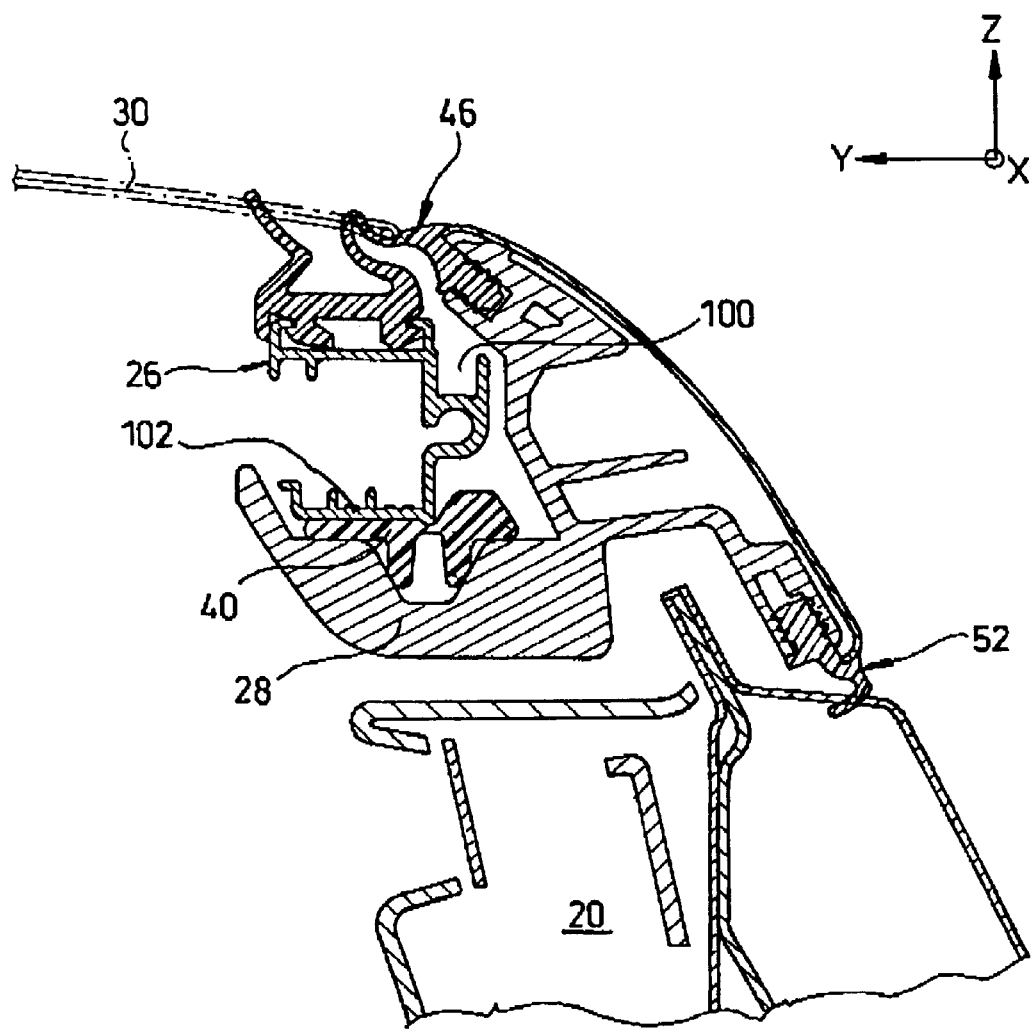
FIG. 6 is a partial section through the rear area of the side member taken along line VI—VI of FIG. 4.

A profile seal 46 which is shown in FIGS. 5 to 7 is inserted into the corresponding receivers on the top section of the front guide rail section 26 and the side member 28, and prevents penetration of moisture or dirt from overhead into the area between the front guide rail section 26 and the side member 28. At the same time, the profile seal 46, which is shown in the unloaded state, seals the folding roof 30 relative to the vehicle interior in the area of the side members 28. Furthermore, on the side member 28, there are profile seals 48 and 52 which are used to seal the side member 28 with reference to the door window 50 or to the B column 20 and are likewise shown in the unloaded state.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Motor vehicle roof guide rail arrangement for accommodating movement of at least one movable roof part, comprising at least one first and one second guide rail section which are detachably joined to one another via a joint and which are movable into alignment with one another at the joint, the openable roof part being movable across the joint; wherein the first guide rail section comprises a centering element which interacts with a complementary opposite element on the second guide rail section, one of the first guide rail section and the second guide rail section being flexibly supported at least in an area of the joint on a guide rail support part of the motor vehicle.

2. Motor vehicle roof guide rail arrangement as claimed in claim 1, wherein the centering element and the opposite element are constructed in a manner enabling alignment errors between the guide rail sections to be equalized by linear elastic displacement of an end of at least one the first and second guide rail sections facing the joint in the directions essentially perpendicular to a displacement direction of the openable roof part along the guide rail sections.

3. Motor vehicle roof guide rail arrangement as claimed in claim 1, wherein the centering element and the opposite element are constructed in a manner enabling alignment errors between the first and the second guide rail section the guide rail sections to be equalized by elastic tilting of an end of at least one of the first and second guide rail sections facing the joint around the axis which runs essentially in a displacement direction of the openable roof part along the guide rail sections.

4. Motor vehicle roof guide rail arrangement as claimed in claim 1, wherein the flexible support has a flexibility which is greatest in the area of the joint and decreases with increasing distance from the joint.

5. Motor vehicle roof guide rail arrangement as claimed in claim 1, wherein at least one of the first and second guide rail sections is rigidly connected to the guide rail support part of the motor vehicle in an area of an end which faces away from the joint.

6. Motor vehicle roof guide rail arrangement as claimed in claim 5, wherein at least one of the first and the second guide rail sections is essentially rigidly connected to the guide rail support part over about 20 to 40% of its total length, proceeding from the end facing away from the joint.

7. Motor vehicle roof guide rail arrangement as claimed in claim 6, wherein an area of the at least one of the first and second guide rail sections which extends between the joint and the area of said at least one of the first and second guide rail sections which is rigidly connected to the guide rail support part is flexibly supported relative to the guide rail support part.

8. Motor vehicle roof guide rail arrangement as claimed in claim 1, wherein the flexible support in at least the area of the joint is provided by a rubber elastic intermediate element between at least one of the first and second guide rail sections and the guide rail support part.

9. Motor vehicle roof guide rail arrangement as claimed in claim 1, wherein the centering element comprises a centering journal and the opposing element comprises a centering bearing, the centering journal being insertable into the centering bearing.

10. Motor vehicle roof guide rail arrangement as claimed in claim 9, wherein the centering journal is insertable into the centering bearing essentially perpendicular to a plane which comprises the joint.

11. Motor vehicle roof guide rail arrangement as claimed in claim 9, wherein the centering bearing comprises an insertion section which tapers towards a centering section, the centering journal being receivable in the centering section in a play-free manner.

12. Motor vehicle roof guide rail arrangement as claimed in claim 11, wherein the centering journal linearly contacts the centering section of the centering bearing when the centering journal is in the centering bearing.

13. Motor vehicle roof guide rail arrangement as claimed in claim 11, wherein the centering journal, at least in an area of its play-free reception in the centering section has a non-round cross section.

14. Motor vehicle roof guide rail arrangement as claimed in claim 13, wherein the non-round cross section is an essentially rectangular cross section.

15. Motor vehicle roof guide rail arrangement as claimed in claim 11, wherein the centering journal is elongated, proceeding from its area of play-free reception in the centering section, essentially in and opposite an insertion direction of the centering journal into the centering bearing and tapers in said insertion direction.

16. Motor vehicle roof guide rail arrangement as claimed in claim 9, wherein the centering bearing is a plastic part and is injected onto the second guide rail section in the area of the joint.

17. Motor vehicle roof guide rail arrangement as claimed in claim 1, wherein the centering element comprises at least one second centering journal and the opposite element comprises at least one second centering bearing, the second centering journal being insertable into the second centering bearing.

18. Motor vehicle roof guide rail arrangement as claimed in claim 17, wherein the second centering journal is a centering strip which is fixed to the first guide rail section and projects across the joint; and wherein the second centering bearing is molded in one piece to the second guide rail section.

19. Motor vehicle roof guide rail arrangement as claimed in claim 1, wherein the first and the second guide rail sections are completely separable from one another at the joint.

20. Motor vehicle roof guide rail arrangement as claimed in claim 1, wherein the first and the second guide rail sections are pivotable with reference to one another at the joint.

21. Motor vehicle roof guide rail arrangement as claimed in claim 1, wherein one of the first and second guide rail sections is located on a roof part which is detachably connected to the guide rail support of the motor vehicle and which completely supports the openable roof part in an open position thereof.

22. Motor vehicle roof guide rail arrangement as claimed in claim 1, wherein the guide rail support part extends in a displacement direction of the openable roof part along the guide rail sections.

23. Motor vehicle roof guide rail arrangement as claimed in claim 22, wherein the guide rail support part is a roof side member that is detachably connected to the motor vehicle.

* * * * *